3,035,029
THIOAMIDE CURE OF HALOGENATED
COPOLYMERS
Kenneth W. Powers, Nixon, and Samuel B. Robison, Roselle, N.J., assignors to Esso Research and Engineering Company, a corporation of Delaware
No Drawing. Filed Sept. 21, 1959, Ser. No. 841,005
18 Claims. (Cl. 260—79)

This invention relates to vulcanizable rubbery polymeric compositions which comprise halogenated copolymers of isoolefins and multiolefins together with thioamides, and to the preparation and vulcanization of such compositions. More particularly, the present invention relates to improved methods for curing halogenated butyl rubber with minor proportions of certain thioamides containing the structure

Copolymers of the above general type especially where the copolymer contains about 85 to 99.5% (preferably about 95 to 99.5%) of a $C_4$ to $C_7$ isoolefin such as isobutylene with about 15 to 0.5% (preferably 5 to 0.5 weight percent) of a multiolefin of about 4 to 14, preferably about 4 to 6 carbon atoms and having a Staudinger molecular weight of between about 20,000 and 300,000, are commonly referred to in patents and literature as "butyl rubber" or GR–I rubber (Government Rubber-Isobutylene) and, for example, is referred to as "butyl rubber" in the textbook "Synthetic Rubber" by G. S. Whitby. The preparation of butyl type rubber is described in U.S. Patent 2,356,128 to Thomas et al. as well as in technical literature. In general, the multiolefinic component of the rubber comprises a conjugated diolefin such as isoprene, butadiene, dimethyl butadiene, piperylene, etc. The reaction product of isobutylene and isoprene is preferred. Butyl rubber has a mole percent unsaturation of between about 0.5 to 15.0.

Halogenated butyl-type rubbery copolymers, which may be cured or vulcanized with zinc oxide alone are produced by halogenating the butyl rubber in a manner which does not degrade the molecular weight thereof, but halogenated sufficiently to produce a rubbery product which, when vulcanized, retains its tensile strength upon heat aging. Although such cures solely with zinc oxide are satisfactory for many purposes, the cure is not as rapid as is desirable and the vulcanized products formed do not exhibit sufficiently high extension moduli and tensile strengths for use in the bead areas and carcass layers of tires. Also, the dynamic drift, appearance and permanent set of vulcanizates cured solely by zinc oxide leave much to be desired.

In accordance with the present invention, the above mentioned disadvantages are overcome and halogenated butyl rubber is cured at an accelerated rate to produce vulcanizates exhibiting improvements in extension modulus, tensile strength, dynamic drift, appearance and permanent set by vulcanizing the halogenated butyl rubber in the absence of added elemental sulfur by a combination of zinc oxide and at least one thioamide of the structure

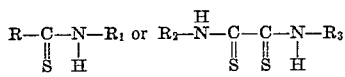

when R, $R_1$, $R_2$ and $R_3$ are hydrogen or $C_1$ to $C_{18}$ alkyl, and $C_6$ to $C_{18}$ aryl, alkaryl or aralkyl groups.

In practicing the present invention, 100 parts by weight of halogenated butyl rubber are compounded in the absence of added sulfur with about 0.5 to 50, advantageously about 1.0 to 40 and preferably about 2.0 to 30 parts by weight of zinc oxide and about 0.05 to 10, advantageously about 0.2 to 5.0 and preferably about 0.5 to 3.0 parts by weight of a thioamide such as listed above, with the optional addition of such conventional compounding agents as up to about 150 parts by weight of fillers such as carbon blacks or clays, up to 1 or 5 parts by weight of nitroso aromatic compounds such as N,4-dinitroso-N-methyl aniline, up to 0.5 or 2.0 parts by weight of antioxidants such as phenyl-beta-naphthylamine, up to 1 or 5 parts by weight of antitack agents such as stearic acid, up to 10 or 50 parts by weight of plasticizers such as hydrocarbon oils, resins, etc. The resulting compounded stock is then cured by heating the same for about one minute to five hours, advantageously for about three minutes to three hours and preferably for about five minutes to two hours at a temperature level of between about 200° to 400° F. and preferably at about 275° to 375° F. to produce a vulcanizate of excellent appearance having a combination of high tensile strength and extension modulus as well as low permanent set and dynamic drift.

In producing halogenated butyl rubber to be vulcanized in accordance with the present invention, unmodified, unvulcanized butyl rubber is carefully halogenated so as to contain about at least 0.5 weight percent (preferably at least about 1.0 weight percent) combined halogen but not more than about "X" weight percent combined fluorine or chlorine or 3 "X" weight percent combined bromine or iodine wherein:

$$X = \frac{M_3 L}{(100-L)M_1 + L(M_2 + M_3)} \times 100$$

and
$L$=mole percent of the multiolefin in the polymer
$M_1$=molecular weight of the isoolefin
$M_2$=molecular weight of the multiolefin
$M_3$=atomic weight of halogen Restated, there should be at least about 0.5 weight percent of combined halogen in the polymer but not more than about one atom of fluorine or chlorine or three atoms of bromine or iodine combined in the polymer per molecule of multiolefin present therein; i.e., not more than about one atom of combined fluorine or chlorine or three atoms of combined bromine or iodine per double bond in the polymer.

Suitable halogenating agents which may be employed are gaseous chlorine, liquid bromine, iodine monochloride, hydrogen fluoride, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), pyridinium chloride perchloride, N-bromo-succinimide, alpha-chloroacetoacetanilide, tri-bromophenol bromide, N-chloroacetamide, beta-bromo-methyl phthalimide, N,N'-dimethyl-5,5- dichloro or dibromo hydantoin, and other common halogenating agents.

The halogenation is generally conducted at about −50° C. to about +200° C., advantageously at about 0° to 65° C. and preferably at about 20° to 50° C. (room temperature generally being satisfactory), depending upon the particular halogenation agent, for about one minute to several hours. The pressure range is not critical and may vary from about 0.5 to 400 p.s.i.a., atmospheric pressure being satisfactory. The halogenation conditions are regulated to halogenate the rubbery copolymer to the extent above-mentioned.

The halogenation may be accomplished in various ways. For instance, the solid copolymer may be halogenated per se. Another process comprises preparing a solution of the copolymer as above, in a suitable inert liquid organic solvent such as a $C_3$ to $C_{10}$ or preferably a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc., and adding thereto gaseous chlorine, liquid bromine, or other halogenating agent, which may optionally be in solution, such as dissolved in an inert hydrocarbon, an alkyl chloride, carbon tetrachloride, etc.

both zinc oxide and diamine-cured vulcanizates, containing this chlorinated interpolymer, were excellent.

HALOGENATED BUTYL RUBBERS "B" TO "L"

Other examples of halogenated isoolefin-multiolefin copolymers which may be used are tabulated hereinafter, the amount of isoolefin and multiolefin in copolymer, halogenation agent, and amount of halogen combined in the copolymer being as follows:

| Halogenated Rubber | Isoolefin (percent)[1] | Multiolefin (percent)[1] | Halogenation Agent | Percent Halogen in the Rubber [1] |
|---|---|---|---|---|
| B | Isobutylene (98) | Isoprene (2.0) | $SO_2Cl_2$ | 1.2 chlorine. |
| C | Isobutylene (95) | Isoprene (5.0) | Gaseous chlorine | 2.0 chlorine. |
| D | Isobutylene (94) | Cyclopentadiene (6.0) | $Cl_2$ in $CCl_4$ | 2.4 chlorine. |
| E | Isobutylene (92) | Myrcene (8.0) | Iodine monochloride | 0.7 iodine. |
| F | 2-methyl-butene-1 (95) | Isoprene (5.0) | $Cl_2$ in hexane | 1.5 chlorine. |
| G | 3-methyl-butene-1 (96) | Butadiene (4.0) | Hydrogen fluoride | 1.2 fluorine. |
| H | Isobutylene (98) | 1-vinyl cyclo-hexene-3 (2.0) | $Cl_2$ in $CCl_4$ | 0.8 chlorine. |
| I | Isobutylene (92) | Butadiene (8.0) | Gaseous chlorine | 2.8 chlorine. |
| J | Isobutylene (85) | Isoprene (15.0) | Gaseous chlorine | 6.6 chlorine. |
| K | Isobutylene (98) | Isoprene (2.0) | N,N'-dichloro-5,5-dimethyl hydantoin | 1.1 chlorine. |
| L | Isobutylene (98) | Isoprene (2.0) | Liquid bromine | 2.3 bromine. |

[1] Percent in all instances is percent by weight.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The polymer may be precipitated with acetone or any other known non-solvent for the butyl rubber and dried under about 1 to 760 millimeters or higher of mercury pressure absolute at about 0° to 180° C., preferably at about 50° to 150° C. (e.g. 70° C.). Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the halogenated butyl rubber solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 150,000 and 2,000,000 and a mole percent unsaturation of between about 0.5 to 15.0, preferably about 0.6 to 5.0.

In order to more fully illustrate the present invention, the following experimental data are given:

CHLORINATED BUTYL RUBBER "A"

A copolymer of about 97% isobutylene and 3% isoprene having a viscosity average molecular weight of 320,000 was dissolved in hexane to form a 10% solution. To this polymer solution, 20 weight percent (based on the polymer) of liquid sulfuryl chloride as the chlorinating agent was added and reacted for 30 minutes with the polymer at room temperature. The resulting chlorinated copolymer was precipitated with acetone, collected and redissolved in hexane three times and ultimately dried and analyzed and found to have a viscosity average molecular weight of 320,000 and to contain 1.4% chlorine based on the polymer. The physical characteristics of

CHLORINATED BUTYL RUBBER "M"

An additional run was made chlorinating a commercial isobutylene-isoprene butyl rubber copolymer dissolved in benzene. The butyl rubber had a Mooney viscosity at 212° F. for eight minutes of 75, and a mole percent unsaturation of 1.6. The chlorination of a solution of the uncured butyl rubber was conducted in a 500-gallon glass-lined Pfaudler reactor equipped with an agitator, baffle, submersed stainless steel sparger ring and a conduit leading into the ring.

Gaseous chlorine was continuously added to the butyl rubber solution over a period of ½ hour at a temperature level of 30° C. and under atmospheric pressure. The chlorine was added to the reactor through the conduit via the sparger ring. The chlorination was then terminated and the solution containing the chlorinated butyl rubber formed was agitated for an additional twenty minutes. The resulting solution of chlorinated butyl rubber was then water washed three times to remove dissolved hydrogen chloride.

The absolute amount of butyl rubber, benzene solvent and gaseous chlorine added, as well as the calculated percent of added chlorine based on polymer and resulting percent of chlorine combined in the polymer were as follows:

| | Pounds | Composition of Chlorinated Product, Percent |
|---|---|---|
| Butyl Rubber | 170 | 98.65 |
| Benzene Solvent | 1,540 | |
| Chlorine | 4.8 (i.e. 2.8%) | 1.35 |

The resulting water-washed solution containing the stabilized, chlorinated butyl rubber "M" was then recovered by injecting the solution into an agitated aqueous slurry containing zinc stearate and a small amount of a non-ionic wetting agent of the aliphatic polyoxyethylene ether type (e.g., Sterox AJ or Tergitol NPX) in an amount of 0.7 pound of the zinc stearate per 100 pounds of chlorinated butyl rubber as a dispersing aid. The agitated solution was maintained at a temperature between about 190° and 210° F. (e.g., 200° F.) whereby to flash off the benzene solvent and form an aqueous slurry of the chlorinated butyl rubber in water. This slurry was then filtered and the chlorinated butyl rubber, which was in the form of a wet "crumb," was placed in a Proctor and Schwartz tray drier maintained at 180° F. (i.e., 82° C.) and dried for 12 hours. The crumb depth on the tray was about ½ inch. The crumb was then completely dried and compacted by milling for 15 minutes on a conventional rubber mill having a roll temperature of 260° F. (i.e., 127° C.).

*Example I*

A control sample of 100 parts by weight of a chlorinated isobutylene-isoprene butyl rubber copolymer having a Mooney viscosity (212° F. for eight minutes) of 65, a mole percent unsaturation of 1.3, a viscosity average molecular weight of 475,000 and a combined chlorine content of 1.1 weight percent were compounded with 5.0 parts by weight of zinc oxide, 45 parts by weight of MPC carbon black, 1.0 part by weight of stearic acid, 0.2 part by weight of N,4 dinitroso-N-methylaniline, and 10 parts by weight of a hydrocarbon plasticizer oil "A" which was derived from a naphthenic crude oil and had a specific gravity of 0.90, a flash point by the open cup method of 445° F., a viscosity in SSU at 100° F. of 510 and at 210° F. of 55, and an iodine number of 16 cg./g.

Additional samples were compounded as above and additionally, in accordance with the present invention, with either one part by weight of the thioamide "thioacetanilide" or 1.5 parts by weight of the thioamide "thiobenzanilide," the data being as follows:

Unmodified ZnO cure at 307° F. for 15 min.:
  300% modulus (p.s.i.) _____ 750
  Tensile strength (p.s.i.) _____ 1550
  Elongation (percent) _____ 460
  Shore "A" hardness _____ 45

Goodrich flexometer data at 100° C. (cured for 30 min. at 307° F.):
  Percent permanent set _____ 2.5
  Percent dynamic drift _____ 3.1
  Appearance—shattered (split and delaminated in 20 min.).

Cure with ZnO plus thioamide at 307° F. for 15 min.:

|  | Thioacetanilide | Thiobenzanilide |
|---|---|---|
| 300% Modulus (p.s.i.) | 1,460 | 1,510 |
| Tensile Strength (p.s.i.) | 2,125 | 1,900 |
| Elongation (percent) | 395 | 350 |
| Shore "A" Hardness | 50 | 50 |

Goodrich flexometer data at 100° C. (cured for 30 min. at 307° F.):

|  | Thioacetanilide | Thiobenzanilide |
|---|---|---|
| Percent Permanent Set | 1.6 | 1.5 |
| Percent Dynamic Drift | 0.0 | 0.0 |
| Appearance | Excellent | Excellent |

The above data show that by curing halogenated butyl rubber, in accordance with the present invention, by a combination of zinc oxide and a thioamide, a faster cure is obtained resulting in vulcanizates having higher extension moduli and tensile strength (using curing conditions of only 15 minutes at 307° F.), compared to a vulcanizate produced by the unmodified zinc oxide cure. The data also show that the cures, in accordance with the invention, result in vulcanizates having beneficially lower permanent sets and dynamic drifts as well as no visual indications of failure after testing.

*Example II*

100 parts by weight of a brominated isobutylene-isoprene butyl rubber copolymer having a Mooney viscosity (212° F. for eight minutes) of 62, a mole percent unsaturation of 0.98, a viscosity average molecular weight of 409,000 and a combined bromine content of 2.38 weight percent were compounded in the presence and absence of 0.75 part by weight of dithiooxamide with 45.0 parts by weight of MPC carbon black, 1.0 part by weight of stearic acid, 5.0 parts by weight of zinc oxide and 10.0 parts by weight of the hydrocarbon plasticizer oil "A" as in Example I. Upon vulcanizing at 307° F. for 15 and 60 minutes, the following physical inspections were noted:

| Added Thioamide | None | | 0.75 part by weight | |
|---|---|---|---|---|
| Curing Time (Minutes) | 15 | 60 | 15 | 60 |
| 300% Modulus (p.s.i.) | 1,140 | 1,240 | 1,450 | 1,575 |
| Tensile Strength (p.s.i.) | 2,050 | 1,840 | 2,070 | 1,950 |
| Elongation (Percent) | 415 | 390 | 390 | 350 |

The above data show that by curing halogenated butyl rubber, in accordance with the present invention, by a combination of zinc oxide and a dithioamide, a faster cure is obtained resulting in vulcanizates having higher extension moduli compared to vulcanizates produced by curing solely with zinc oxide as the curative. For example, the 300% modulus when using no added thioamide in the cure was only 1240 p.s.i. even when vulcanized for 60 minutes, whereas curing for only 15 minutes in the presence of 0.75 part by weight of the thioamide resulted in a higher modulus value of 1450 p.s.i.

Resort may be had to modifications and variations of the disclosed embodiments without departing from the spirit of the invention or the scope of the appended claims.

What is claimed is:

1. A composition free of added elemental sulfur comprising a major proportion of a rubbery halogenated copolymer of about 85 to 99.5 weight percent of a $C_4$ to $C_7$ isoolefin and about 15 to 0.5 weight percent of a $C_4$ to $C_{14}$ multiolefin and a minor proportion of a combination of zinc oxide and a thioamide selected from the group consisting of

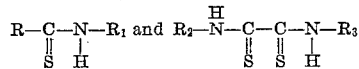

wherein R, $R_1$, $R_2$ and $R_3$ are selected from the group consisting of hydrogen, $C_1$ to $C_{18}$ alkyl, aryl, alkaryl and aralkyl groups.

2. A composition according to claim 1 in which the halogenated copolymer is selected from the group consisting of those containing at least 0.5 weight percent chlorine but not more than about one atom of chlorine per double bond in the copolymer, those containing at least about 0.5 weight percent bromine but not more than about three combined atoms of bromine per double bond in the copolymer, and mixtures thereof.

3. A composition according to claim 1 in which the thioamide is present in an amount of between about 0.05 and 10.0 weight percent based on halogenated copolymer.

4. A composition according to claim 1 in which the zinc oxide is present in an amount of between about 0.5 and 50.0 weight percent based on halogenated copolymer.

5. A composition according to claim 1 in which the thioamide has the formula

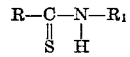

wherein R and $R_1$ are selected from the group consisting of hydrogen, $C_1$ to $C_{18}$ alkyl groups, and $C_6$ to $C_{18}$ aryl, aralkyl and alkaryl groups.

6. A composition according to claim 5 in which the thioamide has the formula

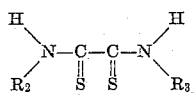

wherein $R_2$ and $R_3$ are selected from the group consisting of hydrogen, $C_1$ to $C_{18}$ alkyl groups, and $C_6$ to $C_{18}$ aryl, aralkyl and alkaryl groups.

7. A composition according to claim 5 in which the thioamide is thiobenzanilide.

8. A composition according to claim 5 in which the thioamide is thioacetanilide.

9. A composition according to claim 6 in which the thioamide is dithiooxamide.

10. A composition according to claim 5 which has been vulcanized by heating the same for between about one minute and five hours at a temperature level of between about 200° and 400° F. to produce a vulcanizate having a high tensile strength, high extension modulus, low permanent set and low dynamic drift.

11. A composition free of added elemental sulfur comprising a rubbery polymer having a viscosity average molecular weight of at least about 100,000 comprising atoms of hydrogen, carbon and a halogen selected from the group consisting of fluorine, bromine, chlorine, iodine and mixtures thereof, containing in its structure a major proportion of hydrocarbon units derived by the polymerization of isoolefins containing about 4 to 7 carbon atoms and also containing sufficient units in which a pair of carbon atoms is linked by an olefinic double bond that the mole percent unsaturation is between about 0.5 and 15; said polymer containing at least about 0.5 weight percent halogen but not more than about one combined atom of halogen per double bond in the polymer; said polymer being in composition with a vulcanizing amount of a combination of zinc oxide and a thioamide selected from the group consisting of

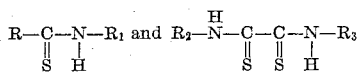

wherein R, $R_1$, $R_2$ and $R_3$ are selected from the group consisting of hydrogen, $C_1$ to $C_{18}$ alkyl, aryl, alkaryl and aralkyl groups.

12. A composition according to claim 11 in which the polymer contains a halogen selected from the group consisting of chlorine, bromine and mixtures thereof.

13. A composition according to claim 11 in which the thioamide is present in an amount of between about 0.2 and 5.0 weight percent, the zinc oxide being present in an amount of between about 1.0 and 40 weight percent based on the halogen-containing polymer.

14. A composition according to claim 11 in which the polymer is also in composition with about 20 to 80 parts by weight of a filler per 100 parts by weight of polymer.

15. A composition according to claim 11 which has been vulcanized for between about five minutes and two hours at a temperature level of between about 275° and 375° F. to produce a vulcanizate having an extension modulus at 300% elongation of at least about 1000 p.s.i., the dynamic drift being below about 1.0%.

16. A process which comprises vulcanizing halogenated butyl rubber composition free of added elemental sulfur in the presence of about 2 to 30 weight percent of zinc oxide and about 0.5 to 3.0 weight percent of a thioamide at a temperature level of between about 275° and 375° F. until the resulting vulcanizate exhibits a tensile strength of at least about 1800 p.s.i., an extension modulus at 300% elongation of at least about 1000 p.s.i., a permanent set of below about 2.0% and a dynamic drift of below about 1.0% said thioamide being selected from the group consisting of

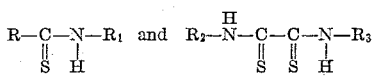

wherein R, $R_1$, $R_2$ and $R_3$ are selected from the group consisting of hydrogen, $C_1$ to $C_{18}$ alkyl, aryl, alkaryl and aralkyl groups.

17. A process according to claim 16 in which the halogenated butyl rubber contains chlorine.

18. A process according to claim 16 in which the halogenated butyl rubber contains bromine.

References Cited in the file of this patent
UNITED STATES PATENTS

| | | |
|---|---|---|
| 1,873,934 | Lommel et al. | Aug. 23, 1932 |
| 2,732,354 | Morrissey et al. | Jan. 24, 1956 |